(No Model.)

C. H. FRY, Jr.
Preserving Can.

No. 241,204.   Patented May 10, 1881.

Witnesses:
James E. Hutchinson.
Howell Bartle.

Inventor:
Charles Henry Fry, Jr,
by Johnson and Johnson
Attys

UNITED STATES PATENT OFFICE.

CHARLES H. FRY, JR., OF BELLAIRE, OHIO, ASSIGNOR OF ONE-HALF TO JOHN J. McDERMOTT, OF SAME PLACE.

PRESERVING-CAN.

SPECIFICATION forming part of Letters Patent No. 241,204, dated May 10, 1881.

Application filed February 24, 1881. (No model.)

*To all whom it may concern:*

Be it known that I, CHARLES HENRY FRY, Jr., a citizen of the United States, residing at Bellaire, in the county of Belmont and State of Ohio, have invented new and useful Improvements in Preserving-Cans, of which the following is a specification.

My invention is directed to improvements in means for excluding air from cans or receptacles for preserving fruits and other articles in which a rubber band is applied to and upon the outside of circumferential joint, forming beads or projections of the cover and vessel, so as to close over said projecting beads and the joint formed thereby.

Hitherto the surface-bearing for such sealing-band has been convex, with a close joint, and forming a continuous bearing, over which the band by its elastic force closes. I find edge bearings forming an open joint for such a sealing-band to give better results in excluding the air from the interior of the vessel, as the band will sink into the space and close over and upon the joint edges, so that a cord or wire wound around the band over the joint-space will increase the binding force of the rubber band upon and between the joint-forming ridges.

Figure 1:
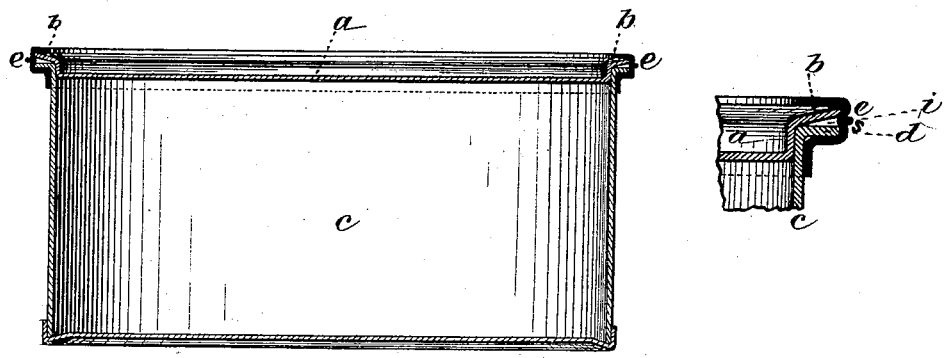
Figure 2:
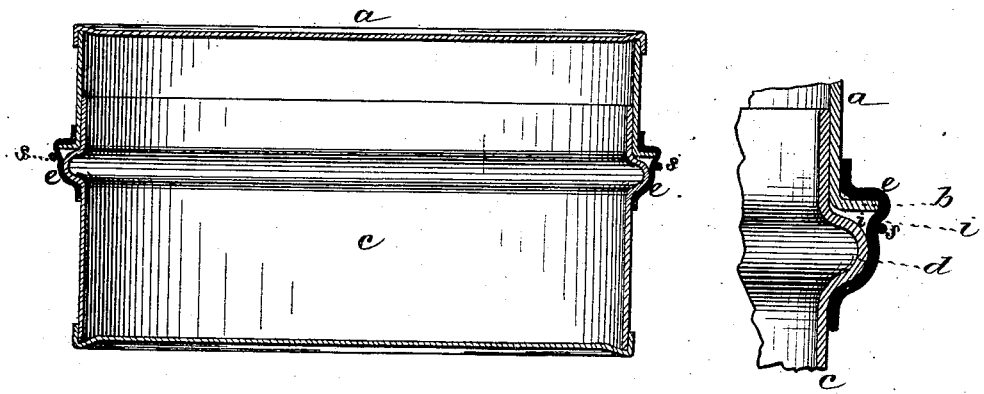

In the accompanying drawings, Figure 1 represents a section of a tin can, showing the cover-joint of open or separated circumferential angular bearing edges sealed by the covering-band, and an enlarged detail of such joint, and Fig. 2 similar views of a modified form of open joint.

The cover $a$ is formed or provided with a circumferential lip, $b$, presenting a comparatively sharp or angular edge of a projection greater than the body of the can, and the body of the can $c$ is formed or provided with an outward-projecting lip, $d$, either around its top edge, as in Fig. 1, for a cover fitting within the vessel, or around its body, for a cover fitting over the outside of the vessel. These lips are separated to form an intervening space, $i$, and distinct edges forming an open joint, which is closed and sealed by an india-rubber band, $e$, preferably of pure rubber, and of a width sufficient to cover and overlap the joint-forming lips. The open-joint space $i$ provides a space, within which the band can be forced over the joint-edges by means of a cord or wire, $s$, wound around the band between the edges, and thereby obtain to the fullest extent the advantage of an open joint of separated edges and a sealing-band sprung over said edges.

In Fig. 2 the joint-ridge on the can is formed by a bead, which allows the band to be forced more deeply into the joint-space $i$ by the binder.

I claim—

For sealing the cover-joint of a preserving-can, the separated edge lips $b$ $d$, forming an open-joint space, $i$, the elastic band $e$, and the binding cord or wire $s$, as described.

In testimony whereof I have hereunto set my hand in the presence of two subscribing witnesses.

CHAS. H. FRY, JR.

Witnesses:
A. E. H. JOHNSON,
J. W. HAMILTON JOHNSON.